United States Patent [19]

Underwood

[11] Patent Number: 5,359,688

[45] Date of Patent: Oct. 25, 1994

[54] METAL INTERNAL HOLDING CLIPS FOR FIBER OPTIC CONNECTOR COUPLING

[75] Inventor: David T. Underwood, N. Richland Hills, Tex.

[73] Assignee: Siecor Corporation, Hickory, N.C.

[21] Appl. No.: 205,435

[22] Filed: Mar. 4, 1994

[51] Int. Cl.5 .............................................. G02B 6/38
[52] U.S. Cl. ...................................... 385/70; 385/53; 385/56; 385/60
[58] Field of Search ....................... 385/70, 72, 53, 56, 385/58, 60, 66, 78

[56] References Cited

U.S. PATENT DOCUMENTS 5,159,652  10/1992  D'Alphonse et al. ............... 385/56

Primary Examiner—John D. Lee
Assistant Examiner—Phan Thi Heartney
Attorney, Agent, or Firm—J. David Abernethy

[57] ABSTRACT

A pair of rigid metallic clips is inserted over containment numbers in a fiberoptic connector coupling. Rigid leg members mounted on the clips extend along latching members of the containment members, thereby limiting displacement of the latching members owing to spring pressure in connector sleeves joined by the connector coupling.

10 Claims, 2 Drawing Sheets

METAL INTERNAL HOLDING CLIPS FOR FIBER OPTIC CONNECTOR COUPLING

BACKGROUND OF THE INVENTION

The field of the invention is couplers for fiber optic connector sleeves.

The prior art has provided connector couplings for joining fiber optic connector sleeves useful for widely used connectors, such as SC connectors. Spring forces internal to the fiber optic connector sleeves urge two opposing optical fiber holding ferrules to be connected against each other. Under the basic principle of action-reaction, however, an opposing spring force is created which is taken up by latches mounted on containment members into which the ferrules are inserted. Applicant has found that, over time, the constant reactive spring force causes strain on the external plastic housing that is welded or glued around the latch fingers. Such strain can cause failure of the entire connector coupling assembly. Therefore, it is believed that a need exists to improve the prior art connector couplings to decrease or eliminate the risk of such connector coupling failures.

SUMMARY OF THE INVENTION

All features of the preferred embodiment shown in the drawing, with the exception of the rigid clips and extended leg members mounted thereto, are believed to be part of the prior art. The improved fiber optic connector coupling includes two containment members each comprising a wall having opposing first and second sides, two resilient latches mounted to the wall first side and adapted to receive a fiber optic connector sleeve therein, an extended first tube mounted between the two latches to the wall first side in communication with the wall perforation, and a wall extension, with the wall second sides placed adjoining each other with communicating wall perforations such that the two first tubes delimit a passage, each wall having at least one extension abutting the extension of the other wall to thereby prevent rotation of the two walls with respect to each other; a second tube adapted to receive two opposing optical fiber holding ferrules therein to be connected, the second tube held in the passage; two rigid metallic clips each fitted over the two containment members, preventing separation of the wall members; and an external housing adapted to receive the rigid clips and fiber optic connector sleeves to be connected. Each metallic rigid clip covers the wall member extension of each containment member, and each clip may have mounted thereto first and second rigid leg members extending alongside a containment member latch to limit latch displacement owing to connector sleeve pressure.

BRIEF DESCRIPTION OF THE DRAWINGS

The detailed description is made with reference to the drawings, in which.

DETAILED DESCRIPTION OF THE PREFERRED EMBODIMENT

Figure 1:
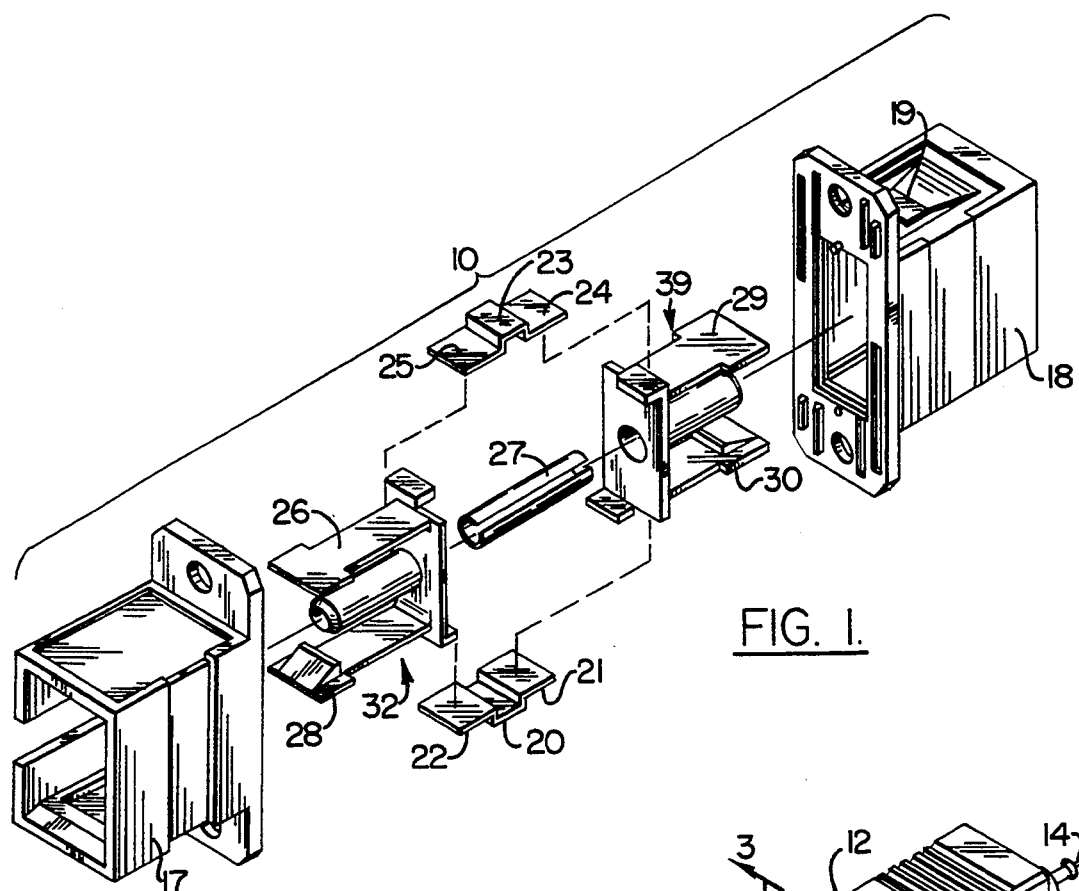
FIG. 1 is a perspective view of component parts of the connector coupling separated and spaced for better viewing.
Figure 2:
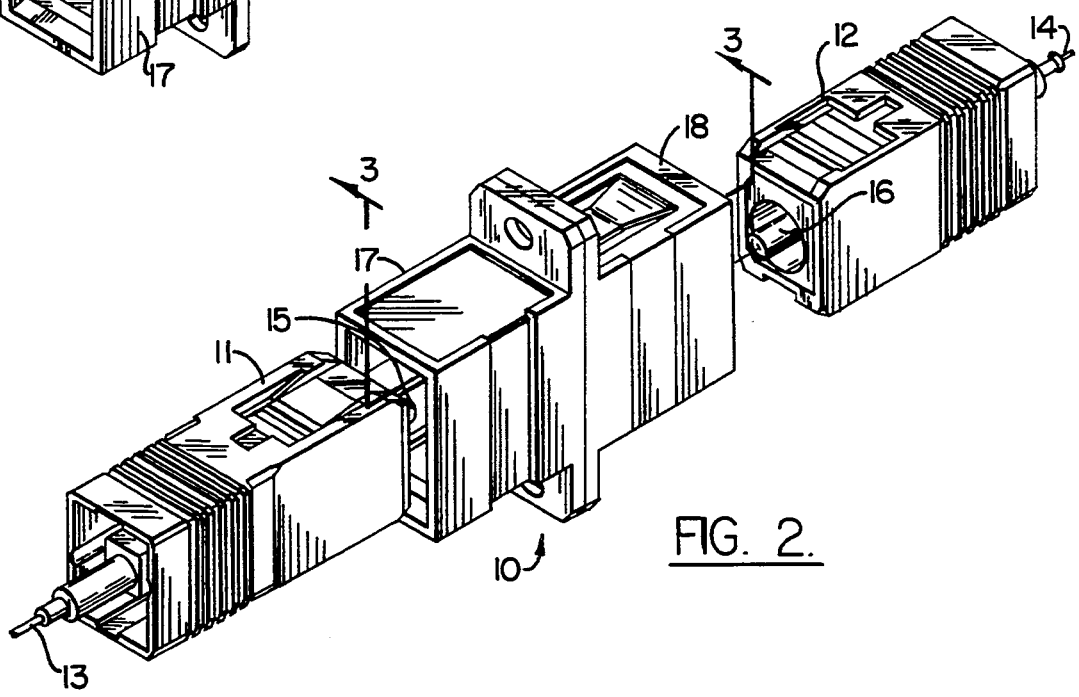
FIG. 2 is a perspective view of a complete coupling with fiber optic connector sleeves to be inserted in either side thereof.

The preferred embodiment shown is that of an SC connector coupling. Other types of connectors could be coupled as desired.

The function of the connector coupling is to join fiber optic connector sleeves 11, 12 to each other for optical transmission. Connector sleeve 11 contains ferrule 15 containing optical fiber 13, and connector sleeve 12 contains ferrule 16 containing optical fiber 14. These are coupled to each other in external housing 10.

External housing 10 comprises members 17, 18 which are mounted to each other by means such as an adhesive or ultrasonic welding. A metallic member 19 is shown fitted around housing half 18.

Internal to the external housing are containment members 32, 39. Containment member 29 includes a wall having wall perforation 34, wall first side 36 and wall second side 35. Mounted to wall first side 36 are a first tube 31 mounted between resilient latches 29, 30. First tube 31 is in communication with wall perforation 34.

Containment member 32 is in all respects identical to containment member 39 in its structure.

When containment members 32, 39 are fitted together with their second sides touching, the first tubes form a continuous channel into which slitted second tube 27 is placed. In operation, slitted second tube receives ferrules 15, 16 to be abutted together. Containment member 39 has wall extensions 33, 37, which fit snugly alongside like wall extensions of containment member 32. When containment members 32, 39, are fitted together, the wall extensions mesh and prevent rotation of either containment member with respect to the other. If desired, wall extensions 33, 37 can be ultrasonically welded to the complementary wall extensions of containment member 32.

Figure 3:
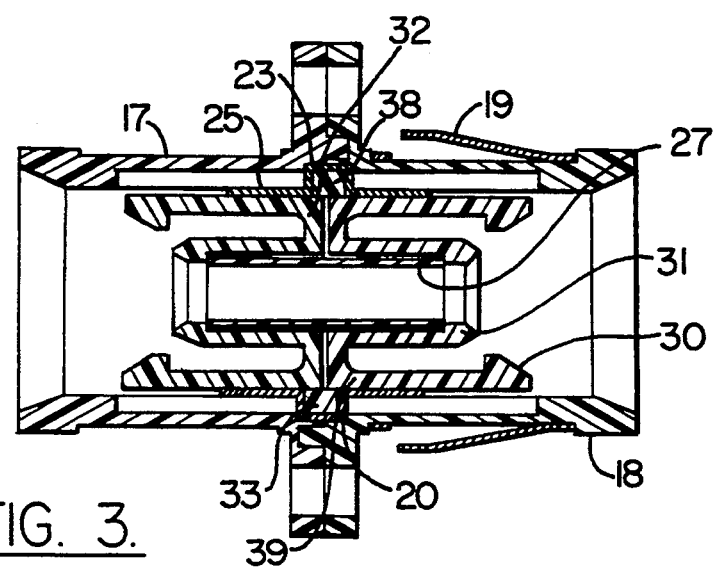
FIG. 3 is a sectional view of the connector coupling taken along lines 3—3; and, FIG. 4 is a perspective view of a single containment member.
Figure 4:
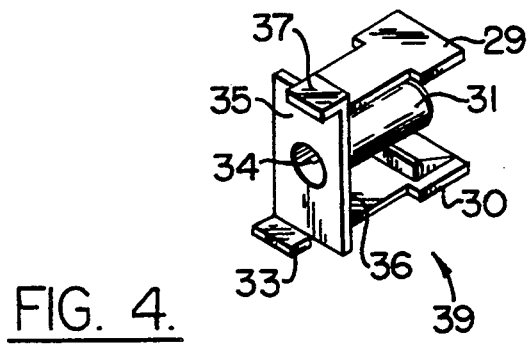

In the improved feature provided by the invention, metallic clips 23, 20 are placed over either side of the wall extensions of containment members 32, 39. The rigid metallic clips 23, 20 serve to eliminate unwanted separation of the containment members owing to internal spring forces. If desired, clip 23 may be provided with rigid leg members 25, 24, and clip 20 may be provided with rigid leg members 22, 21, each of which rigid leg members extends alongside a containment member latch to limit latch displacement owing to connector sleeve pressure. As shown in FIG. 3, clip 23, for example, fits over wall extension 38 from containment member 32 and wall extension 37 from containment member 39.

All components of the coupling may be manufactured from injection molded plastic except the metallic clips 20, 23 and metallic attachment 19.

What is claimed is:

1. A fiber optic connector coupling, comprising:
   two containment members each comprising a wall having opposing first and second sides, two resilient latches mounted to the wall first side and adapted to receive a fiber optic connector sleeve therebetween, an extended first tube mounted between the two latches to the wall first side in communication with a wall perforation, and a wall extension, with the wall second sides placed adjoining each other with communicating wall perforations such that the two first tubes delimit a passage, each wall having at least one extension abutting the extension of the other wall thereby preventing rotation of the two walls with respect to each other; a second tube adapted to receive two opposing optical fiber holding ferrules therein to be connected, the second tube held in the passage; two rigid clips each fitted over the two containment members preventing separation of the wall members; and, an external housing adapted to receive the rigid clips and fiber optic connector sleeves to be connected.

2. A fiber optic connector coupling as recited in claim 1 wherein the rigid clip covers a wall member extension of each containment member.

3. A fiber optic connector coupling as recited in claim 1 wherein the rigid clip is metallic.

4. A fiber optic connector coupling as recited in claim 1, further comprising first and second rigid leg members mounted to the rigid clip, each leg member extending alongside a containment member latch, thereby limiting latch displacement owing to connector sleeve pressure.

5. A fiber optic connector coupling as recited in claim 4 wherein the rigid clip covers a wall member extension of each containment member.

6. A fiber optic connector coupling as recited in claim 4 wherein the rigid clip is metallic.

7. A fiber optic connector coupling, comprising:

two containment members each comprising a wall 11 having opposing first and second sides, two resilient latches mounted to the wall first side and adapted to receive a fiber optic connector sleeve therebetween, and an extended first tube mounted between the two latches to the wall first side in communication with a wall perforation, with the wall second sides placed adjoining each other with communicating wall perforations such that the two first tubes delimit a passage; a second tube adapted to receive two opposing optical fiber holding ferrules therein to be connected, the second tube held in the passage; two rigid clips each fitted over the two containment members preventing separation of the wall members; and, an external housing adapted to receive the rigid clips and fiber optic connector sleeves to be connected.

8. A fiber optic connector coupling as recited in claim 7 wherein the rigid clip is metallic.

9. A fiber optic connector coupling as recited in claim 7, further comprising first and second rigid leg members mounted to the rigid clip, each leg member extending alongside a containment member latch, thereby limiting latch displacement owing to connector sleeve pressure.

10. A fiber optic connector coupling as recited in claim 9 wherein the rigid clip is metallic.

* * * * *